F. W. NOLTE.
EYEGLASSES.
APPLICATION FILED MAY 11, 1909.

982,985.

Patented Jan. 31, 1911.

WITNESSES:
W. G. McMillan
[signature]

INVENTOR.
Frederick W. Nolte
BY Ridout & Maybee
ATTORNEYS

UNITED STATES PATENT OFFICE.

FREDERICK W. NOLTE, OF VICTORIA, BRITISH COLUMBIA, CANADA.

EYEGLASSES.

982,985. Specification of Letters Patent. Patented Jan. 31, 1911.

Application filed May 11, 1909. Serial No. 495,224.

*To all whom it may concern:*

Be it known that I, FREDERICK W. NOLTE, of the city of Victoria, in the Province of British Columbia, Canada, have invented certain new and useful Improvements in Eyeglasses, of which the following is a specification.

My invention relates to eyeglass mounts of the type comprising a bridge rigid with the lens clamps having nose pieces pivoted on the bridge and provided with forwardly projecting finger grips, and my object is: (1) To provide eyeglasses of that type in which no special pivot pin will be required. (2) To apply a spring to the nose piece in such a manner that it is almost entirely hidden and may be more easily attached or detached than in the types of mounts now in use. (3) To give the nose piece a yielding longitudinal adjustability to the nose, the tension against which the yielding movement occurs being provided by the same spring which moves the nose piece as a whole.

I attain my object by a construction which may be briefly described as follows:—The nose piece is formed as an integral lever shaped to form plates embracing the flattened end of the bridge, and a forwardly extending finger grip. This lever rocks against the rounded part of the bridge. A spring is bent round between the two plates and one arm of the spring engages the lens clamp and the other the nose piece. The nose pad is preferably formed with one end hinged upon the main part and engaged by the spring which not only moves the nose piece as a whole but also yieldingly presses the hinged end toward its normal position.

Figure 1:
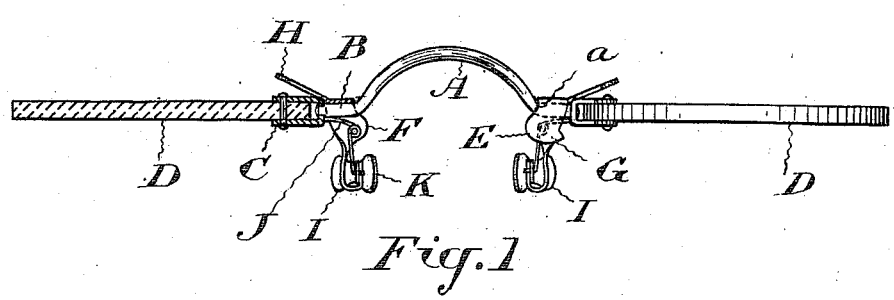
Figures 2, 3:
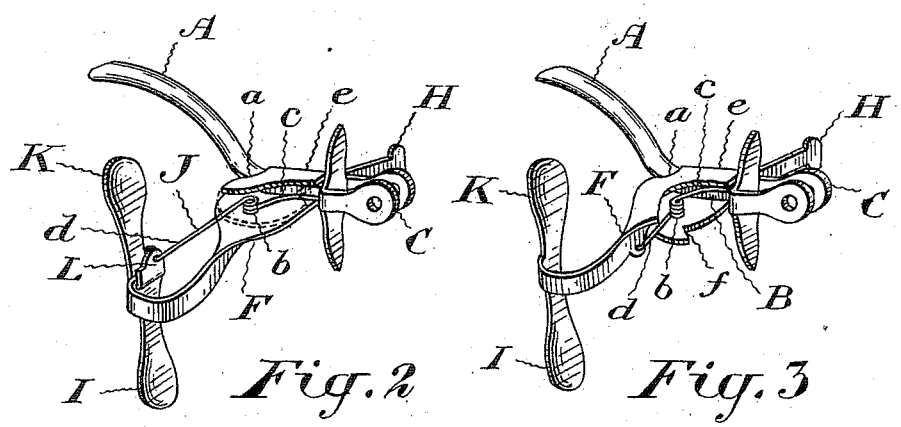
Figures 4, 5:
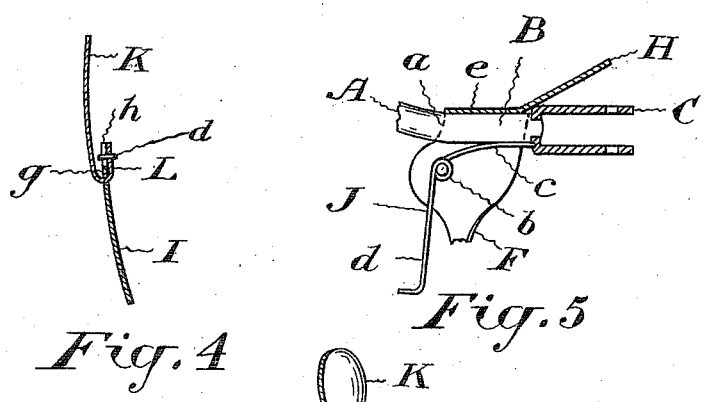
Figure 6:
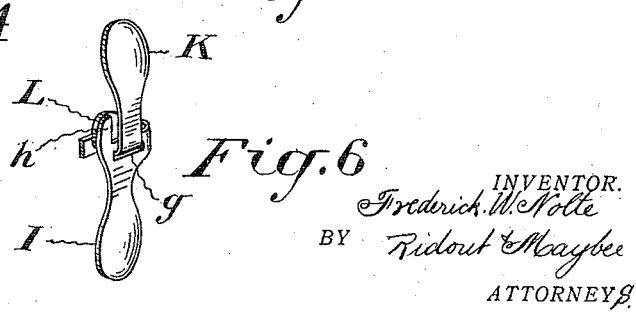

Figure 1 is a plan view partly in section of my improved mount. Fig. 2 is an enlarged perspective detail partly broken away showing the preferable form of the mount. Fig. 3 is a similar view showing a modification of the same. Fig. 4 is a longitudinal section through the nose pads of one of the nose pieces. Fig. 5 is a sectional plan view of part of the mount showing particularly the arrangement of the spring. Fig. 6 is a perspective detail of the nose pads shown in Fig. 2, looking from the other side.

In the drawings like letters of reference indicate corresponding parts in the different figures.

A is the bridge. The ends B of the bridge are preferably laterally extended, that is outwardly in the direction of the lenses and are connected to or formed integral with the lens clamps C which are connected to the lenses D in the ordinary manner.

E are the nose pieces. These are preferably integral pieces suitably stamped out and bent to form the plates F and G which embrace closely the flattened ends B, the forwardly extending finger grips H and the rearwardly extended nose pads I. The plates F and G are preferably notched as indicated at $a$ to fit against and turn on the rounded parts of the bridge A where it arches up from the ends B. Owing to this arrangement each nose piece will turn freely or fulcrum on the bridge while the engagement between the plates F and G and the flattened end of the bridge prevents any displacement of the nose piece from the plane in which it is intended to swing.

The spring tension intended to keep the nose guard yieldingly pressed toward its normal position is provided by means of the bent spring J preferably formed of fine steel wire bent to form intermediate its ends a small coil $b$ and arms $c$ $d$. The forward arm $c$ is engaged with any suitable part of the lens mount. I show it in the drawings and particularly in Figs. 1 and 5 as having its end engaged with a groove or nick in the lens clamp. The rearwardly extending arm $d$ has its end engaged with the nose piece preferably by being bent round and inserted in a hole formed in the nose piece. The spring it will be seen is not connected in any way with any of the parts except at its ends and these connections are such that the spring may be released from its engagement at any time and removed. The spring is also almost entirely inclosed by the plates F and G and is therefore hidden from view. This spring I find in practice is very effective and allows for the free movement of the nose guard without any rubbing or sliding of either end of the spring against the part with which it may be engaged.

It will be noted that the metal $e$ connecting the two plates F and G at their forward edges by engaging the forward edge of the end B serves as a stop to limit the inward swing of the nose pieces. To limit the outward swing when the nose piece is operated by means of the finger grip H I form a shoulder $f$ on one of the plates F and G which shoulder will engage the lens clamp C.

In order to make the nose pads carried by the nose pieces self adjusting to the nose I preferably form each nose pad of two pieces as shown in Figs. 1, 2, 4 and 6, the upper part K being hinged upon the lower part to swing in a plane at right angles to that in which the nose piece as a whole is movable. I show this hinge as formed by bending up the lower end L and passing it through a slot $g$ formed at the upper end of the lower part of the pad. A finger $h$ engages this bent up end L to limit the inward swing of the part K (see particularly Fig. 4.)

As I desire to use only one spring to each nose piece instead of engaging the rearward arm $d$ of the spring J with the forward part of the nose piece, as shown in Fig. 3, I extend it rearwardly and engage it with a small hole formed in the end L of the upper part K of the nose piece. The spring thus tends to maintain both the nose piece and the movable part of the pad in their normal positions.

While I have described the part K as a part of the pad I, yet in effect of course it forms a separate pad that might be used alone.

From the above description it will be seen that my device is very simple, neat and effective, the parts being reduced to a minimum and arranged to admit of the desired movements with the least possible chance of displacement or loosening taking place.

What I claim as my invention is:—

1. In an eye glass mount the combination of a bridge with a laterally directed lower end; a nose piece formed as a lever shaped to embrace said end and fulcrumed on the end of the arch of the bridge; a rearwardly extended nose pad on the lever; a forwardly extended finger grip; and a separate bent wire spring located behind the fulcrum and formed with a central coil located adjacent to the fulcrum, and two arms, one arm extending rearwardly and having an engagement with the lever and the other extending laterally and having an engagement with a stationary part of the mount.

2. In an eye glass mount the combination with a stationary part of the mount of a nose piece fulcrumed thereon; and a bent spring behind the fulcrum having a releasable engagement at one end with the nose piece and a releasable engagement at the other end with the stationary part, and plates on the stationary part between which the spring lies and which serve to releasably retain it in position.

3. In an eye glass mount the combination with a stationary part of the mount of a nose piece fulcrumed thereon; and a bent wire spring located behind the fulcrum and formed with a central coil and two arms, one having a releasable engagement with the nose piece and the other a releasable engagement with the stationary part, and plates on the stationary part between which the spring lies and which serve to releasably retain it in position.

4. In an eye glass mount the combination of a bridge with a laterally directed flattened lower end; a nose piece embracing said flattened end and fulcrumed on the end of the arch of the bridge; and a separate spring located behind the fulcrum engaging the nose piece and a stationary part of the mount.

5. In an eye glass mount the combination of a bridge with a laterally directed flattened lower end a nose piece embracing said flattened end and fulcrumed on the end of the arch of the bridge; and a bent spring, located behind the fulcrum and between the parts of the nose piece embracing the end of the bridge, and engaging the nose piece and a stationary part of the mount.

6. In an eye glass mount the combination of a bridge with a laterally directed flattened lower end; an integral nose piece shaped to form connected plates embracing the said end of the bridge with the connection between the plates adapted normally to engage the forward side of said end, a forwardly extended finger grip, and a rearwardly extended nose pad.

7. In an eye glass mount the combination with a stationary part of the mount of a nose piece having a swinging action therewith; a nose pad hinged on the nose piece to move in a plane at right angles to the plane of movement of the nose piece and a single spring engaging the nose pads and tending to maintain both the nose piece and the pad in their normal position.

8. In an eye glass mount the combination with a stationary part of the mount of a nose piece having a swinging action therewith; a nose pad hinged on the nose piece to move in a plane at right angles to the plane of movement of the nose piece; and a single bent spring having a releasable engagement at one end with the nose pad and at the other end with the stationary part.

9. In an eye glass mount the combination of a nose piece having a nose pad hinged thereon to swing substantially parallel to the plane of the lenses; a stop limiting the inward movement of the pad; and a spring tending to maintain the pad in its normal position as defined by the stop.

10. In an eye glass mount the combination of a bridge with a laterally directed flattened lower end; a nose piece embracing said flattened end and having a pivotal movement thereon; a nose pad hinged on the nose piece to move in a plane substantially at right angles to the plane of movement of the nose piece; and a bent spring, located partly between the parts of the nose piece embracing the end of the bridge, and engaging the nose pad and a stationary part of the mount.

Dated this 27th day of April 1909.

FREDERICK W. NOLTE.

Signed in the presence of—
   EDMOND HUESTIS,
   ROBERT M. NEWCOMB.